United States Patent Office 3,347,868
Patented Oct. 17, 1967

3,347,868
METHOD OF PREPARING 3-THIETANONE 1,1-DIOXIDES
James C. Martin, Kingsport, Tenn., assignor to Eastman Kodak Company, Rochester, N.Y., a corporation of New Jersey
No Drawing. Continuation of application Ser. No. 274,850, Apr. 22, 1963. This application Apr. 28, 1966, Ser. No. 546,105
4 Claims. (Cl. 260—327)

This is a continuation of application Ser. No. 274,850, filed Apr. 22, 1963, now abandoned.

This invention relates to novel organic compounds and more particularly to 3-thietanone 1,1-dioxides and to methods for preparing them.

The compounds of the invention have the general formula:

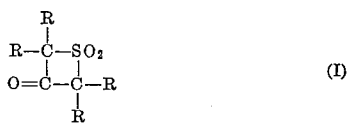

wherein the substituents R are the same or different and can be hydrogen or hydrocarbon radicals free of ethylenic and acetylenic unsaturation and having 1 to 8 carbon atoms, thus including alkyl, cycloalkyl, phenyl, and lower alkyl-substituted phenyl radicals of 1 to 8 carbon atoms. Preferred substituents include the straight and branched chain lower alkyl radicals such as methyl, ethyl, propyl and butyl. The compounds of the invention are useful principally as reagents or chemical intermediates.

The compounds of the invention can be prepared by several novel procedures in accordance with the invention. For example, they can be prepared by hydrolysis of 3,3-dialkoxythietane 1,1-dioxides in the presence of dilute mineral acids, as illustrated by the following equation:

(1) 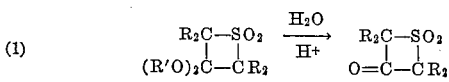

wherein R has the same meaning as above and the substituents R' are alkyl radicals of 1 to 8 carbon atoms, preferably lower alkyl, or are joined lower alkylene radicals forming a heterocyclic ring with the oxygen atoms. The substituents R' can be the same or different radicals of these types. R and R' have these meanings in all usages herein.

The starting materials for reaction (1), can be prepared by the reaction of an alkyl or aryl sulfonyl chloride of the formula, $R_2CH$—$SO_2Cl$, with a ketene acetal of the formula, $R_2C=C(OR')_2$, in the presence of a hydrogen chloride acceptor, e.g., a tertiary amine such as triethylamine, as illustrated hereinafter. The procedure has also been disclosed recently by Truce et al., J. Am. Chem. Soc., 84, 3030 (1962).

Another suitable procedure comprises the hydrolysis in similar manner of 3-aminothiete 1,1-dioxides as follows:

(2) 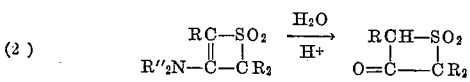

wherein the substituents R'' of the amino group, taken singly, represent the same or different alkyl radicals of 1 to 8 carbon atoms, preferably lower alkyl, and, taken collectively with the nitrogen atom to which they are attached, represent morpholino, thiamorpholino, pyrrolidinyl, or piperidino groups and these groups having lower alkyl substituents on at least one of their carbon atoms.

The starting materials for reaction (2), the 3-dialkylaminothiete 1,1-dioxides, can be prepared by the reaction of an alkyl or aryl sulfonyl chloride, $R_2CH$—$SO_2Cl$, with a ketene N,N- or O,N-acetal,

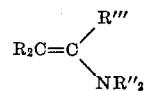

wherein R''' is —OR or —NR''$_2$, in the presence of a hydrogen chloride acceptor, e.g., a tertiary amine such as triethylamine, as illustrated hereinafter.

Another procedure comprises hydrolysis in similar manner of 3-alkoxythiete 1,1-dioxides as follows:

(3) 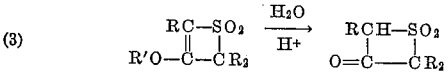

Another procedure comprises the oxidation of 3-thietanol-1,1-dioxides as follows:

(4) 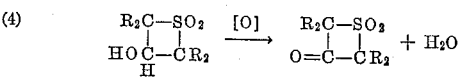

The hydrolytic procedures of reactions (1), (2) and (3) above can employ acidic aqueous solutions as formed with dilute mineral acids such as phosphoric, hydrochloric, sulfuric, etc. or with acidic ion exchange resins, etc. Suitable temperatures range from about 20 to 100° C., with the higher temperatures being used for the higher members of the series. The oxidation procedure of reaction (4) can employ nitric acid, potassium permanganate, air or other common oxidizing agents.

The compounds and method of the invention are further illustrated by the following examples which describe preparation of a precursor, followed by conversion of the precursor to a compound of the invention.

Example 1

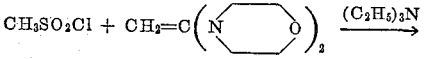

A solution of 19.8 g. (0.1 mole) of 4,4'-vinylidenedimorpholine and 10.1 g. (0.1 mole) of anhydrous triethylamine in 50 ml. of anhydrous tetrahydrofuran was stirred under a nitrogen atmosphere at —2 to +2° while a solution of 11.5 g. (0.1 mole) of methanesulfonyl chloride in 30 ml. of anhydrous tetrahydrofuran was added during 1 hr. The resulting suspension was stirred at 25° for 15 hrs. The solids were separated by filtration and then continuously extracted with tetrahydrofuran. Vacuum concentration of the combined filtrate and extracts gave 15.8 g. (84%) of white crystals of 3-morpholinothiete-1,1-dioxide, M.P. 120–133° C. A sample recrystallized from ethanol melted at 140–142°.

*Analysis.*—Calcd. for $C_7H_{11}NO_3S$: C, 44.4; H, 5.9; N, 7.4. Found: C, 44.9; H, 60; N, 7.5. Infrared maximum at 6.19μ. N.m.r. spectrum (in chloroform) contained single peaks at 530 (C=CH) and 4.40 p.p.m. (CH$_2$), and two sets of triplets centered at 3.75 and 3.20 p.p.m. (morpholino group).

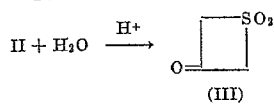

II was stirred in aqueous solution with an acidic ion exchange resin (Amberlite IR-120) and 3-thietanone 1,1-dioxide (III) was recovered in 74 percent yield. After sublimation and recrystallization from tetrachloroethane, the compound melted at 216–221° with decomposition.

Analysis.—Calcd. for $C_3H_4O_3S$: C, 30.0; H, 3.4; S, 26.7. Found: C, 29.8; H, 3.8; S, 26.3. Infrared maximum at 5.62μ. N.m.r. spectrum contained a single peak at 4.98 p.p.m. ($CH_2$ groups).

Infrared and n.m.r. spectra exhibited no evidence of an enol form of (III) in $D_2O$, tetrachloroethane, or dimethyl sulfoxide. In aqueous solution (III) exhibited an acidity (pK$_a$ 4.1) comparable to that of a carboxylic acid and appreciably stronger than an exceptionally acidic five-membered cyclic β-ketosulfone

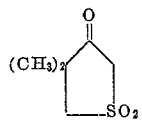

(pK$_a$ 5.8), described recently by Truce et al., J. Org. Chem. 27, 2821 (1962).

Nuclear magnetic resonance spectra (n.m.r.) cited in the above and subsequent examples were obtained with a Varian A–60 spectrometer at 60 mc. Spectra are quoted in p.p.m. relative to tetramethylsilane as an internal standard.

*Example 2*

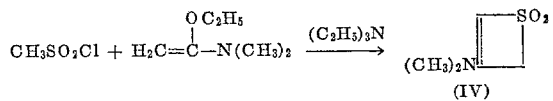

To a stirred solution of 30 g. (0.26 mole) of 1-ethoxy-N,N-dimethylvinylamine and 53 g. (0.52 mole) of triethylamine in 500 ml. of ether was added 29 g. (0.26 mole) of methanesulfonylchloride in 50 ml. of ether. The reaction temperature was kept at 20–25° by using a wet ice bath. The mixture was stirred for 2 hrs. after the addition. The solid was removed by filtration and extracted thoroughly with ether. Evaporation of the ether gave 30 g. of a waxy solid. A sample of this was recrystallized from ethyl alcohol to give 3-dimethylaminothiete 1,1-dioxide (IV), M.P. 121–123°.

Analysis.—Calcd. for $C_5H_9NO_2S$: C, 40.8; H, 6.2; N, 9.5; S, 21.8. Found: C, 40.8; H, 6.3; N, 9.4; S, 21.7. Infrared maximum at 6.1μ. N.m.r. spectrum (in chloroform) contained single peaks at 5.22 (C=CH), 4.45 ($CH_2$), and 2.80 p.p.m. [$N(CH_3)_2$].

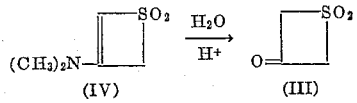

A mixture of 3.0 g. of (IV) and 6 ml. of 10 percent hydrochloric acid solution was stirred at room temperature for one hour. The resulting solid was isolated by filtration and recrystallized from hot tetrachloroethane to give 1.6 g. of 3-thietanone 1,1-dioxide (III).

*Example 3*

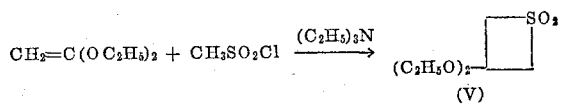

To a stirred solution of 21.0 g. (0.18 mole) of ketone diethylacetal and 35 g. (0.34 mole) of triethylamine in 200 ml. of ether was slowly added 20.6 g. (0.18 mole) of methane sulfonyl chloride. The temperature was maintained at 15–25° during the addition by an ice bath. The mixture was filtered to remove the triethylamine hydrochloride and the filtrate was distilled through a 6-inch Vigreux column to give 24.8 g. (71 percent) of 3,3 - diethoxythietane - 1,1-dioxide (V), B.P. 115–116° (0.5 mm.). This material solidified on cooling to a substance melting at 48–49.5°.

Analysis.—Calcd. for $C_7H_{14}O_4S$: C, 43.3; H, 7.3; S, 16.5. Found: C, 43.0; H, 7.3; S, 16.4. The nuclear magnetic resonance of this compound was in complete agreement with the structure assigned

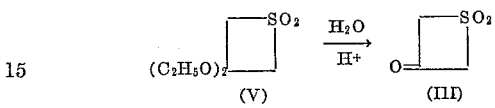

A mixture of 5 g. of (V) and 10 ml. of 10 percent hydrochloric acid solution was stirred at 50° for 8 hours. The resulting solid was removed by filtration, washed with water and dried. It weighed 2.1 g. and its infrared spectrum was identical to the 3-thietanone-1,1-dioxide of Example 1.

*Example 4*

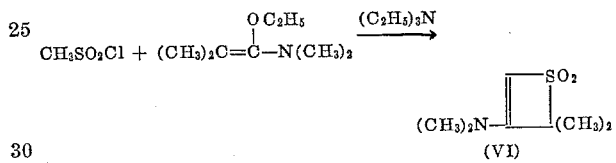

Methanesulfonyl chloride added to a solution of 1-ethoxy-N,N-dimethylisobutenylamine and triethylamine in tetrahydrofuran at 0° C. gave 4,4-dimethyl-3-dimethylaminothiete 1,1-dioxide (VI), M.P. 135–136° C., in 62 percent yield.

Analysis.—Calcd. for $C_7H_{13}NO_2S$: C, 48.0; H, 7.5; N, 8.0; S, 18.3. Found: C, 48.2; H, 7.2; N, 7.8; S, 18.1. Infrared maximum at 6.21μ. N.m.r. spectrum (in chloroform) contained single peaks at 5.05 (C=CH), 2.92 [$N(CH_3)_2$], and 1.67 p.p.m. [$C(CH_3)_2$].

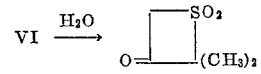

Eight grams of 4,4-dimethyl-3-dimethylaminothiete-1,1-dioxide is stirred with 44 g. of the acid form of Amberlite IR-120 ion-exchange resin and 50 ml. of water at 25° for 3 hours. Vacuum concentration of the water solution gives 6.5 g. (95 percent) of 2,2-dimethyl-3-thietanone-1,1-dioxide, M.P. 108–110°.

Analysis.—Calcd. for $C_5H_8O_3S$: C, 40.5; H, 5.4; S, 21.6. Found: C, 40.7; H, 5.5; S, 21.3.

*Example 5*

Under the general conditions of Example 4, the following 3-thietanone-1,1-dioxides are prepared from the precursors shown:

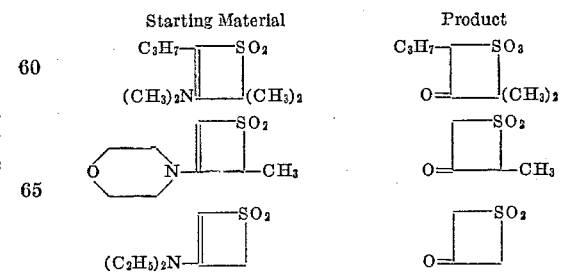

The compounds of the invention provide a novel reactive heterocyclic structure that will be useful as a chemical intermediate for many useful products. Those which have a methylene group (—$CH_2$—) in the 2-position of the four-membered heterocyclic ring can be used to prepare cyanine dyes useful as spectral sensitizers for photographic silver halide emulsions and for zinc oxide in electrophotography. The cyanine dyes can also be used as antihalation or absorbing dyes in photographic materials.

One procedure for preparing such cyanine dyes comprises condensing a compound of the invention of the formula $$\begin{array}{c} H_2C-SO_2 \\ | \quad | \\ O=C-CR_2 \end{array}$$

with one of the so-called "I.C.I. intermediates" which are well-known compounds of the formula $$R^1-\underset{\underset{X_1}{|}}{N}(=CH-CH)_{n-1}=C-CH=CH-\underset{\underset{R^3}{|}}{N}-R^2$$

wherein $n$ is a positive integer from 1 to 2, Z represents the non-metallic atoms necessary to complete a heterocyclic nucleus having 5 to 6 atoms in the heterocyclic ring such as: nuclei of the thiazole series, the benzothiazole series, the oxazole series, the benzoxazole series, the 2-quinoline series, etc.; $R^1$ is an alkyl group; $X_1$ is an acid radical such as chloride, iodide, p-toluenesulfonate, etc.; $R^2$ is a carboxylic acyl group such as acetyl, propionyl, butyryl, etc.; and $R^3$ is a monocyclic aryl group of the benzene series such as phenyl, o-, m-or p-tolyl, etc. A specific example of such a compound with which the compounds of the invention can be reacted to produce a useful cyanine dye is 2-β-acetanilido-vinylbenzothiazole ethiodide:

(VII)

Other suitable compounds of this type are disclosed for example in British 344,409 and U.S. 2,870,014.

The condensation of the "I.C.I. intermediate" with our 3-thietanone 1,1-dioxide compound to produce a useful cyanine dye can be accomplished by heating the reactants, e.g., in equimolar proportions, in the presence of a basic condensing agent, e.g., triethylamine, and preferably an inert diluent such as ethanol, propanol, 1,4-dioxane, cyclohexane, pyridine, etc. When the compound of the invention is unsubstituted 3-thietanone 1,1-dioxide, which has two methylene groups, it can be reacted with two molecular proportions of the I.C.I. intermediate. Temperatures from ambient temperature to the reflux temperature of the reaction mixture can be employed. The resulting dye is recovered by filtration and recrystallization. Suitable procedures for such condensations and product purifications are disclosed in said U.S. 2,870,014, which also discloses well-known procedures by which the dyes formed from the compounds of the invention can be incorporated in photographic silver halide emulsions as spectral sensitizers.

The preparation of such a cyanine dye by condensation of a compound of the invention with compound (VII) above is illustrated by the following equation:

$$VII + \begin{array}{c} H_2C-SO_2 \\ | \quad | \\ O=C-CR_2 \end{array} \xrightarrow{(Et)_3N}$$

cyanine dye

Compounds of the invention can also be reacted with alcohols to form useful acyclic β-alkylsulfonyl acetic acid esters, as illustrated by the equation:

$$\begin{array}{c} R_2C-SO_2 \\ | \quad | \\ O=C-CR_2 \end{array} + AlkOH \longrightarrow R_2CHSO_2CR_2CO_2Alk$$

wherein Alk=lower alkyl.

For example, one can heat a mixture of 3-thietanone 1,1-dioxide and ethanol under reflux and recover by distillation the useful ester, ethyl β-methylsulfonyl acetate. The latter can be used as an intermediate for dyes in the manner disclosed by S. Hünig and O. Boes, Ann., 579, 28 (1953) e.g., $$O_2N-\langle\phantom{x}\rangle-N_2BF_4 + CH_3SO_2CH_2CO_2C_2H_5 \xrightarrow{pH\ 8-9}$$

$$O_2N-\langle\phantom{x}\rangle-NH-N=C\begin{array}{c} CO_2C_2H^5 \\ \diagdown \\ SO_2CH_3 \end{array}$$

Although the invention has been described in detail with particular reference to certain preferred embodiments thereof, variations and modifications can be effected within the spirit and scope of the invention as described hereinabove and as defined in the appended claims.

I claim:
1. The method of preparing a 3-thietanone 1,1-dioxide compound which comprises subjecting to acid hydrolysis a compound of the formula

$$\begin{array}{c} RC-SO_2 \\ \| \quad | \\ R''_2N-C-CR_2 \end{array}$$

wherein the substituents R are each selected from the group consisting of hydrogen and hydrocarbon radical free of ethylenic and acetylenic unsaturation and having 1 to 8 carbon atoms and the substituent R" of the amino group, taken singly, represent alkyl radicals of 1 to 8 carbon atoms and, taken collectively with the nitrogen atom to which they are attached, represent a member of the group consisting of morpholino, thiamorpholino, pyrrolidinyl and piperidino groups.

2. The method according to claim 1 for preparing 3-thietanone 1,1-dioxide which comprises heating 3-morpholinothiete 1,1-dioxide in acidic aqueous solution.

3. The method according to claim 1 for preparing 3-thietanone 1,1-dioxide which comprises heating 3-dimethylaminothiete 1,1-dioxide in acidic aqueous solution.

4. The method according to claim 1 for preparing 2,2 - dimethyl-3-thietanone-1,1-dioxide which comprises heating 4,4-dimethyl-3-dimethylaminothiete 1,1-dioxide in acidic aqueous solution.

References Cited
UNITED STATES PATENTS 2,748,114    5/1956    Brooker et al. _____ 260—327

OTHER REFERENCES

Mayer et al., Angew. Chemie, vol. 73, No. 16 (1961), pp. 578–9.

Prochazka, Chemical Abstracts, vol. 54 (1960), p. 12095.

Truce et al., Jour. Amer. Chem. Soc., vol. 77 (1955), pp. 5063–4.

Truce et al., Jour. Amer. Chem. Soc., vol. 84 (1962), pp 3030–1.

WALTER A. MODANCE, *Primary Examiner.*

JOHN D. RANDOLPH, JAMES A. PATTEN,

*Examiners.*